(No Model.)
J. R. GREGORY.
PLOW ATTACHMENT.
No. 317,340. Patented May 5, 1885.
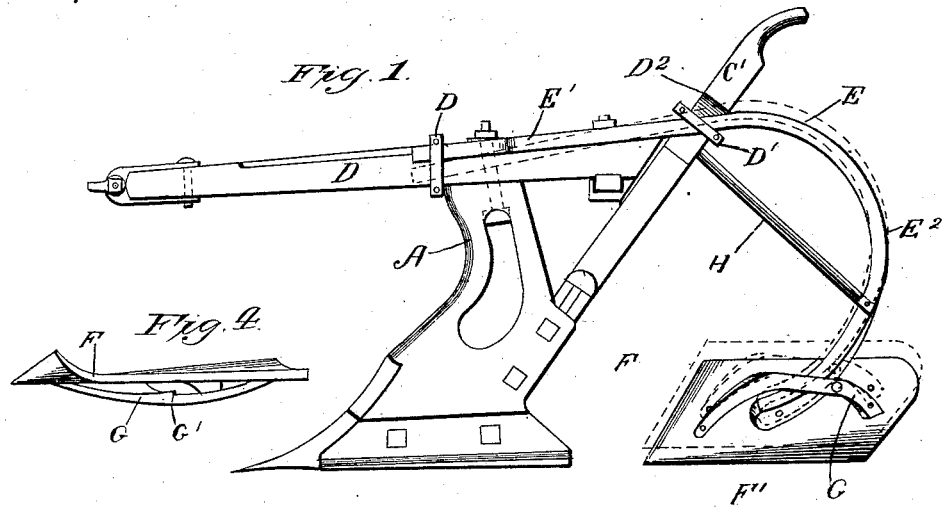
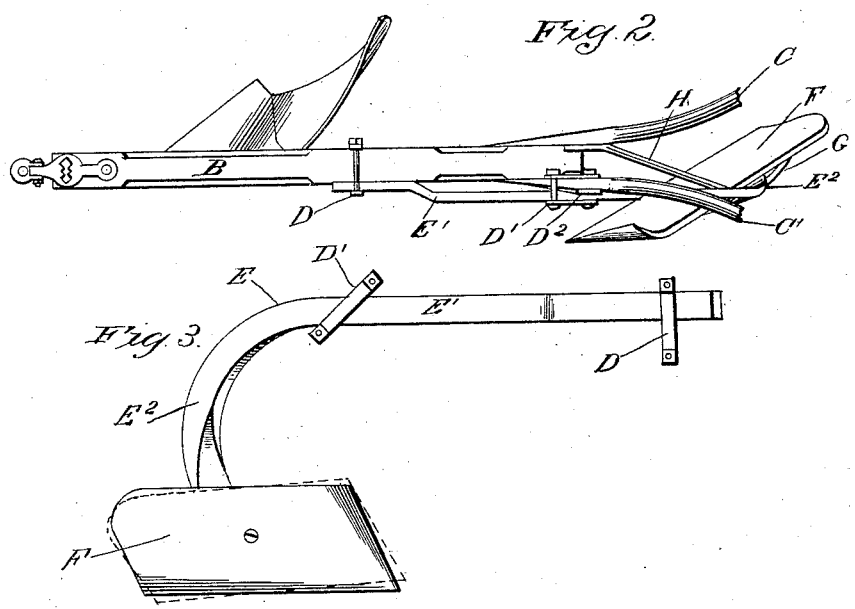
WITNESSES
Sr. A. Clark.
P. B. Turpin.
INVENTOR
John R. Gregory,
By R. S. & A. T. Lacey,
attys.

UNITED STATES PATENT OFFICE.

JOHN R. GREGORY, OF WALLACETON, VIRGINIA, ASSIGNOR OF ONE-HALF TO GEORGE T. WALLACE AND JOHN G. WALLACE, BOTH OF SAME PLACE.

PLOW ATTACHMENT.

SPECIFICATION forming part of Letters Patent No. 317,340, dated May 5, 1885.

Application filed July 29, 1884. (No model.)

*To all whom it may concern:*

Be it known that I, JOHN R. GREGORY, a citizen of the United States, residing at Wallaceton, in the county of Norfolk and State of Virginia, have invented certain new and useful Improvements in Plow Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to plows, and has for its object a simple, convenient, and economical attachment for throwing the dirt away from corn, cotton, or similar stalked crops, or any crop on which a scraper can be used.

It consists in the novel devices presently described, constructed and combined as will be set forth, whereby the cutter or share may be adjusted, as will be fully described.

In the drawings, Figure 1 is a side view of a plow provided with my improvements. Fig. 2 is a plan view of same. Fig. 3 is a side view of the attachment. Fig. 4 is a plan view of the cutter, all of which will be described.

I design to use my improvement on the common single-turn or bar plow, such as shown, or a double-turn plow, or any other suitable form of plow to which it may be desirable to attach a scraper.

I will describe my attachment as applied to the plow shown, of which A is the standard, B the beam, and C C' the handles. A clip or stirrup, D, is placed on the beam slightly in front of the standard, and a similar clip, D', is placed on the handle C', the same being on the landside of the plow, as shown. The bar E, supporting the cutter F, is bent to form the bar E' and the standard E². The forward end of the bar E' is lapped alongside the plow-beam and secured thereto by clip D. Near its rear end the bar is lapped alongside the handle C', and secured thereto by the clip D', supplemented by a tightening wedge-block, D². The bar is thence curved downward, forming the standard, and is pivotally secured at its lower end, F', to the rear side of the cutter F. The forward edge of this cutter, it will be seen, is arranged slightly beyond the landside-line of the plow-share, so that it moves closer the stalks of corn or cotton, and throws the dirt away therefrom. A bail or loop keeper, G, is secured at its opposite ends to the rear side of the cutter, and extends over the standard E² at a point above the pivotal connection, as will be seen in Fig. 1. This bail bears by reason of its tension sufficiently tight against the standard E² to bind and hold against the latter at any angle to which the cutter may be adjusted. I prefer to form the inner side of the bail with a shoulder, G', to engage the front side of the standard and prevent the point of the cutter from being thrown too high. A brace-rod, H, is pivoted at one end to the standard E' slightly above the cutter, and has its other end bolted to the handle C, which may be provided with a series of holes to permit the point of connection of rod H to be changed when the cutter is adjusted in the manner presently described. It will be noticed the clips D D' are wider than the bar E, so the said bar may be adjusted within said clips to vary the height and position of the cutter. For instance, by loosening clip D and turning bar E on clip D' as a pivot the cutter may be adjusted higher, as indicated in Fig. 1, and be secured at such point by tightening clip D. It will also be seen that by moving clip D' along the handle C' the cutter may be adjusted to a greater extent. It will also be noticed that the cutter may be adjusted on its standard, as indicated in Fig. 3 and before referred to, when it is desired to raise or lower the point thereof.

Where applied as before described the cutter or scraper runs about eighteen inches in rear of the plow. The distance of adjustment to rear of the plow is a matter for the judgment of the operator. The brace H being secured low down on the standard E² prevents the twisting or wrenching of the standard when the point strikes a stone or other obstruction, and being connected below the bend or weak part of the standard obviates the liability of same becoming broken, as will be understood.

My invention may be used as an attachment for two turn-plows arranged on a single beam or on two beams secured together by well-known means, and adapted to run on opposite sides of the row of growing plants, as is well known in the cultivation of cotton, corn, &c. In such cases the scrapers are made right hand for one side and left hand for the other side. The change in the "throw" of the scraper, whether to the right or the left, does not alter its principle.

I do not limit myself to making the scraper of any particular size. Various sizes may be adapted to the various sizes of plows sold by dealers.

By means of the clamps D D', which are movable along, respectively, the beam and the handle, the cutter may be set nearer to or farther from the plow-share, as may be desired, or it may be set high or low, the degree of adjustment being practically unlimited. Of course I make no claim to the clips D or D', *per se*, as these taken alone are of common construction.

Having thus described my invention, what I claim, and desire to secure by Letters Patent, is—

1. The combination of the cutter or scraper, the standard pivoted to the rear side thereof, and the bail or keeper G, secured at its opposite ends to the scraper and extended over the standards, substantially as set forth.

2. The combination, with the cutter or scraper, of the standard pivoted to the rear side thereof, and the bail or keeper secured at its opposite ends to the scraper, extended over the standard, and provided on its inner side with a shoulder, G', substantially as and for the purposes specified.

In testimony whereof I affix my signature in presence of two witnesses.

JOHN R. GREGORY.

Witnesses:
R. W. BISHOP,
P. McNICKLE.